UNITED STATES PATENT OFFICE.

ANNA R. LIPPINCOTT, OF BALTIMORE, MARYLAND, ASSIGNEE, BY MESNE ASSIGNMENTS, OF JOSEPH M. LIPPINCOTT.

IMPROVEMENT IN THE MANUFACTURE OF LUBRICATING-OILS.

Specification forming part of Letters Patent No. 57,737, dated September 4, 1866; Reissue No. 8,897, dated September 16, 1879; application filed May 19, 1879.

DIVISION A.

*To all whom it may concern:*

Be it known that JOSEPH M. LIPPINCOTT, of the city of Pittsburg, in the county of Allegheny and State of Pennsylvania, did invent or discover a new and useful Improvement in the Manufacture or Preparation of Lubricating-Oils, of which the following is a specification.

The nature of the invention or discovery consists in reducing from a lighter to a heavier specific gravity, Baumé, the petroleum-oil of commerce, sometimes called "natural" or "rock" oil, by the admixture therewith of pine-tar in such manner that the oleaginous or soluble properties of the tar will blend or combine with the petroleum, thereby making a liquid oil of a greater density or heavier gravity than before the introduction of the pine-tar therein, for the purpose of making a lubricating-oil, and also for the purpose of combining or using with other hydrocarbon or animal oils or petroleum or fatty matter, to improve their lubricating qualities or to reduce their specific gravity to the desired degree, Baumé, as the case may be.

Petroleum as produced from oil-wells is, in most cases, unsuitable for use as a lubricant, the gravity being too light, and the pine-tar of commerce is likewise objectionable on account of there being present in it sand or dirt, as well as a heavy, resinous, pitchy substance, any of which would be detrimental in a lubricating-oil; but by mixing the tar and petroleum together the former is taken up and dissolved in the latter, whereby there is an intimate union or combination formed of the oleaginous or soluble portions of the tar with the petroleum, while the insoluble or foreign matter, as sand, dirt, &c., present in the tar will settle to the bottom of the reducing-tank, the mixture being sufficiently liquid to admit of the settling, after it has stood at rest a length of time varying according to the liquidity or density, after which the oil is drawn off from the lees or sediment.

The pine-tar is soluble at a low temperature, but under heat is taken up much more rapidly. The oleaginous or soluble portions of the tar being taken up or combined with the petroleum, the resultant mixture will be heavier than the raw petroleum, and according to the proportion of the ingredients used, which must be considerably varied with the varying gravity of the oil and the varying proportions of soluble and insoluble matter in the tar and with the intended grade of the lubricant.

For most purposes the compound may be prepared by taking a petroleum-oil of about 32° Baumé, three parts by measure to one part of the pine-tar of commerce known as "Carolina tar," of good quality. The oil being first placed in a suitable tank, and preferably heated to a temperature of about 150° Fahrenheit, the tar should be added gradually, with more or less stirring to facilitate the admixture of the ingredients, the heat being continued during the process until the tar has dissolved. The mixture is then allowed to stand, to permit the impurities to settle to the bottom of the tank, a moderate degree of heat being maintained to facilitate the settling, after which the liquid oil is drawn off above the sediment.

When the ingredients are compounded in or about the proportions referred to, and in the manner above described, they will make a liquid oil of about 28° Baumé, the consistence of which is little affected by changes of temperature, and which is more suitable for lubricating purposes than either of the ingredients used separately.

A petroleum-oil of lighter gravity than 32° Baumé may be used in the combination; but when they are obtainable the petroleum-oils are preferable for this purpose which are the least removed from what are known as "natural lubricants," of about 28° Baumé as they come from the wells, because the heavier the gravity of the oil the nearer it approaches to a natural lubricant and the less the quanity of pine-tar it takes up to reduce itself to the required degree, and also for the reason that when the tar is present in the mixture to a moderate degree it adds materially to the qualities of the oil for lubrication, giving the necessary body and a certain adhesiveness, which holds it to the bearings and prevents it from wasting away under friction, while too much tar has an injurious effect under friction, and when applied to machinery, especially when the motion is rapid, is liable to heat or gum up.

The resultant mixture of petroleum and the soluble or oleaginous ingredients of the pine-tar may also be used to mix with petroleum or other suitable hydrocarbon oils, or animal-oils or fatty matter, to the improvement of their lubricating qualities, or to reduce their gravities, as the case may be. The mixture may be in various proportions; but for most purposes, when making an oil for general use, say about 28° Baumé, there may be taken of the mixture one part by measure of about 24° Baumé, one part of other oil, preferably petroleum, of about 32° Baumé, and combined under heat of about 150° Fahrenheit, in a suitable tank, and it will be found that the result will be an oil of about 28° Baumé, a reduction of 4° Baumé from the gravity of the petroleum. Different proportions will give a different gravity to the compound and a greater or less reduction from the gravity of the oil.

A marked advantage of the invention or discovery is, that oils of light gravity can be reduced to a heavy gravity by the use of pine-tar at a much less cost than by the use of animal-oils. Another advantage is, that the compound oil or lubricant maintains a permanent and substantially uniform liquidity under alternations of heat and cold.

I claim—

1. The reduction from a lighter to a heavier gravity of petroleum-oil by the admixture of pine-tar, substantially as described.

2. A liquid lubricating-oil consisting of petroleum-oil combined with the soluble or oleaginous portions of pine-tar, substantially as described.

ANNA R. LIPPINCOTT.

Witnesses:

EDW. RAINE,

EDW. OTTO.